United States Patent [19]
Murphy et al.

[11] Patent Number: 5,114,277
[45] Date of Patent: May 19, 1992

[54] VITRIFIED UNDERGROUND STRUCTURES

[75] Inventors: Mark T. Murphy, Kennewick; James L. Buelt, Richland; James A. Stottlemyre, Richland; John S. Tixier, Jr., Richland, all of Wash.

[73] Assignee: Battelle Memorial Institute, Richland, Wash.

[21] Appl. No.: 660,205

[22] Filed: Feb. 22, 1991

[51] Int. Cl.⁵ ............................ E02D 3/11; G21F 9/16
[52] U.S. Cl. ..................................... 405/231; 405/128; 405/129; 405/258
[58] Field of Search ................ 405/128, 129, 130, 131, 405/258; 166/60, 248, 249, 302; 252/629

[56] References Cited

U.S. PATENT DOCUMENTS

| | | | |
|---|---|---|---|
| 3,970,573 | 7/1976 | Westhaver | 252/73 |
| 4,376,598 | 3/1983 | Brouns et al. | 405/258 |
| 4,579,525 | 4/1986 | Ross | 432/13 |
| 4,956,535 | 9/1990 | Buelt et al. | 405/131 X |
| 5,004,373 | 4/1991 | Carter | 405/131 |
| 5,024,556 | 6/1991 | Timmerman | 405/128 |

Primary Examiner—Randolph A. Reese
Assistant Examiner—John Ricci
Attorney, Agent, or Firm—Paul W. Zimmerman

[57] ABSTRACT

A method of making vitrified underground structures in which 1) the vitrification process is started underground, and 2) a thickness dimension is controlled to produce substantially planar vertical and horizontal vitrified underground structures. Structures may be placed around a contaminated waste site to isolate the site or may be used as aquifer dikes.

16 Claims, 8 Drawing Sheets

FGURE 13

FIGURE 14

VITRIFIED UNDERGROUND STRUCTURES

This invention was made with Government support under Contract DE-AC06-76RLO 1830 awarded by the U.S. Department of Energy The Government has certain rights in the invention.

FIELD OF THE INVENTION

The present invention relates generally to a method for making vitrified underground structures As referred to herein, the term underground refers to below a soil surface location. The invention relates specifically to the use of in-situ vitrification techniques and improvements to 1) start up underground vitrification, and 2) control the shape of vitrified soil volumes used to make the desired structures.

BACKGROUND OF THE INVENTION

Present methods of isolating contaminated sites by making barriers (such as concrete retaining walls and plastic lined structures) do not have the durability or effectiveness of vitrified soil. Furthermore, present methods may require removal of soil and waste materials, as well as handling steps which are expensive and involve the possibility of hazardous exposure during processing.

Solidification of soil by in-situ melting and vitrification using heat generated in the soil itself between spaced electrodes has previously been accomplished as disclosed in Brouns et al. U.S. Pat. No. 4,376,598 issued Mar. 15, 1983 and further defined and clarified in Brouns et al. Reexamination Certificate 1142nd issued Oct. 17, 1989. Although Brouns et. al. suggest that the method of 1142nd may be used to cover or encapsulate waste materials buried in soil, only limited encapsulation is possible. Using the method of Brouns et al. the volume of soil to be vitrified must be sufficiently near the soil surface that it may be engulfed by a melt initiated at the soil surface and propagated downward by melting. Another limitation of Brouns et al. is that the shape of the melted soil is passively determined by the physical characteristics of the soil which results in melts having large cross sectional areas.

This invention combines the advantages of barriers with the advantages of vitrified soil, the ability to isolate a site on any or all sides with a material that is durable and impermeable.

Although isolation of an underground contaminated site is envisioned as a primary use of this invention, other uses include but are not limited to, ground movement monitoring, in-situ load bearing structures for buildings and towers, and control of water table elevation are envisioned.

SUMMARY OF THE INVENTION

The method of the present invention to form vitrified underground structures for isolating underground sites utilizes in-situ vitrification techniques, but requires additional novel steps needed to 1) start up vitrification underground, and 2) cause the melt to have a substantially planar shape.

To start up vitrification underground, it is necessary to place an initially electrically conductive material at the desired location and depth. Methods for placing initially electrically conductive material include horizontal borehole drilling and injection of conductive solutions through the soil. The initially electrically conductive material may contain graphite powder, or other conductive material placed in an underground startup location. Other conductive materials include but are not limited to non-hazardous metal salts such as sodium carbonate and borax.

Once the vitrification process is started below the soil surface, a vitreous mass may be made having a large cross sectional area which may be approximately pear shaped. In addition, substantially planar vertical and horizontal vitrified underground structures may be made having small cross sectional areas which are approximately rectangular either by controlling the path of the electrical current through the molten soil, or by controlling the apparent melting temperature of soil to be melted, or a combination of both. The term apparent melting temperature is used because soil behaves like ceramic materials which, unlike metal, do not exhibit a definitive phase change at a precise temperature. Vertical vitrified underground structures may also be made by starting at the soil surface and either controlling the electrical current downwardly through the molten soil or the apparent melting temperature of the soil volume to be vitrified, or both.

Underground vitrified structures may be used as aquifer dikes, hazardous waste barriers, ground movement detectors, building foundations, or any other application in which it is desireable to have an underground structure to isolate an area of interest.

This invention overcomes the limitations of present methods of underground site isolation by providing a method for making vitrified underground structures without substantially disturbing, excavating, or handling the subsurface soil. A further improvement of this invention over present methods is isolating a contaminated waste site without disturbing or contacting the contaminated zone. Finally, this invention achieves these improvements through the use of portable equipment.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DESCRIPTION OF THE PREFERRED EMBODIMENT(S)

This disclosure is concerned with 1) methods for starting the vitrification process underground, and 2) making substantially planar vitrified underground structures by controlling the path of electrical current through molten soil, or by controlling the apparent melting temperature of the soil, or a combination of both. As used herein, a substantially planar structure is defined as one in which a thickness dimension is substantially less than a width or height, or diameter dimension, resulting in a cross section of approximately narrow rectangular shape. The sides of the cross section may be irregular due to perturbations in melting the soil.

The process of in-situ vitrification of soil is fully described in Brouns et al. U.S. Pat. No. 4,376,598 and Re-Examination Certificate 1142nd, and is known to those skilled in this art. However, Brouns et al. fails to adequately disclose a method of starting the vitrification process underground and for making substantially planar vitrified underground structures. The process of the present invention addresses both deficiencies.

Figure 1:
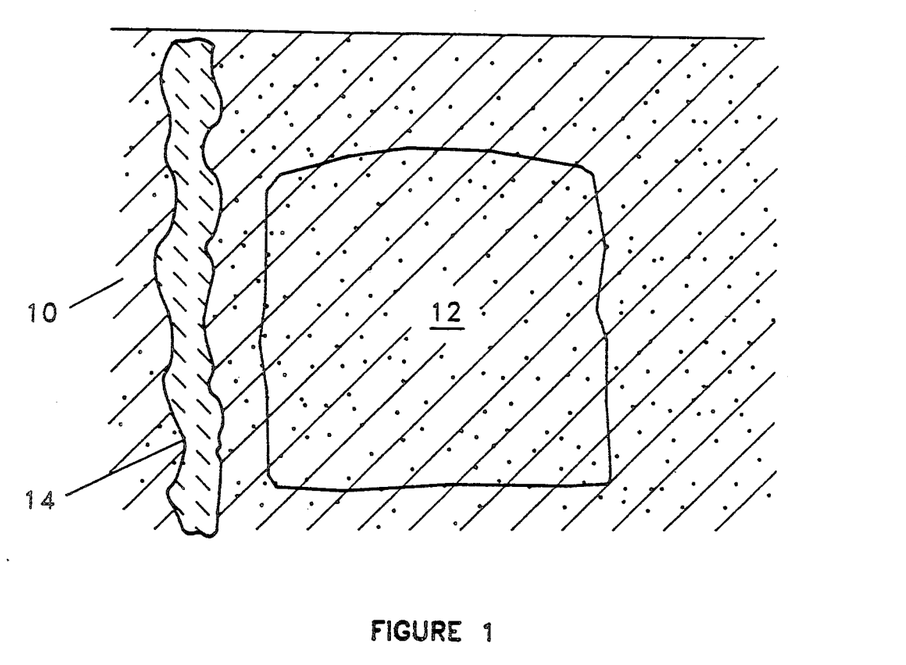
FIG. 1 is a sectional view showing a vertical vitrified underground structure serving as a barrier on one side of a contaminated zone.
Figure 2:
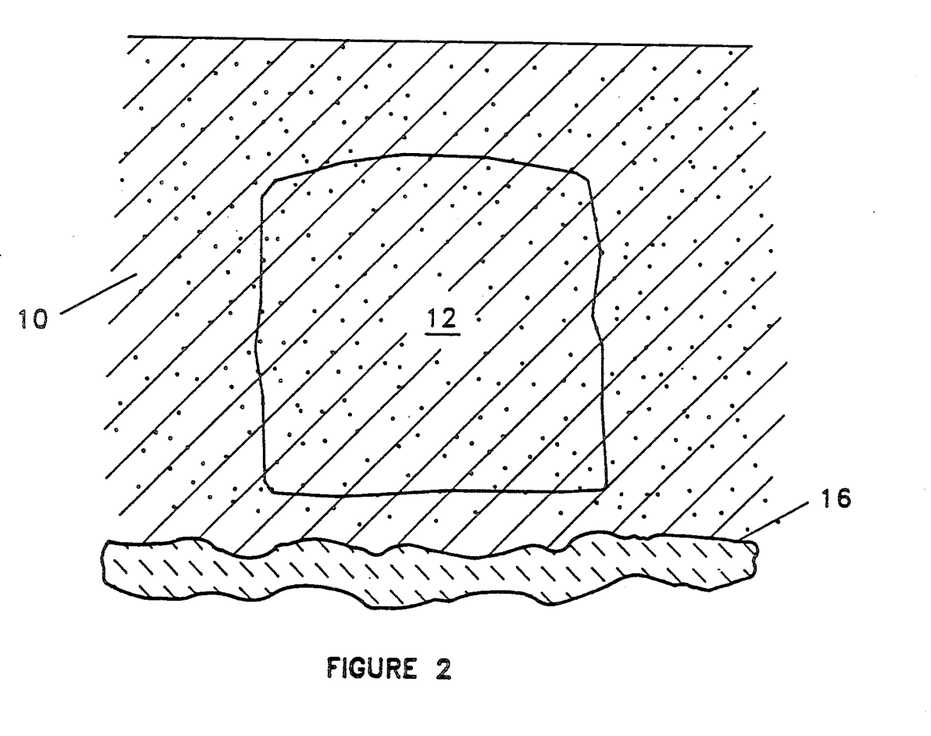
FIG. 2 is a sectional view showing a horizontal vitrified underground structure serving as a barrier underneath a contaminated zone.
Figure 3:
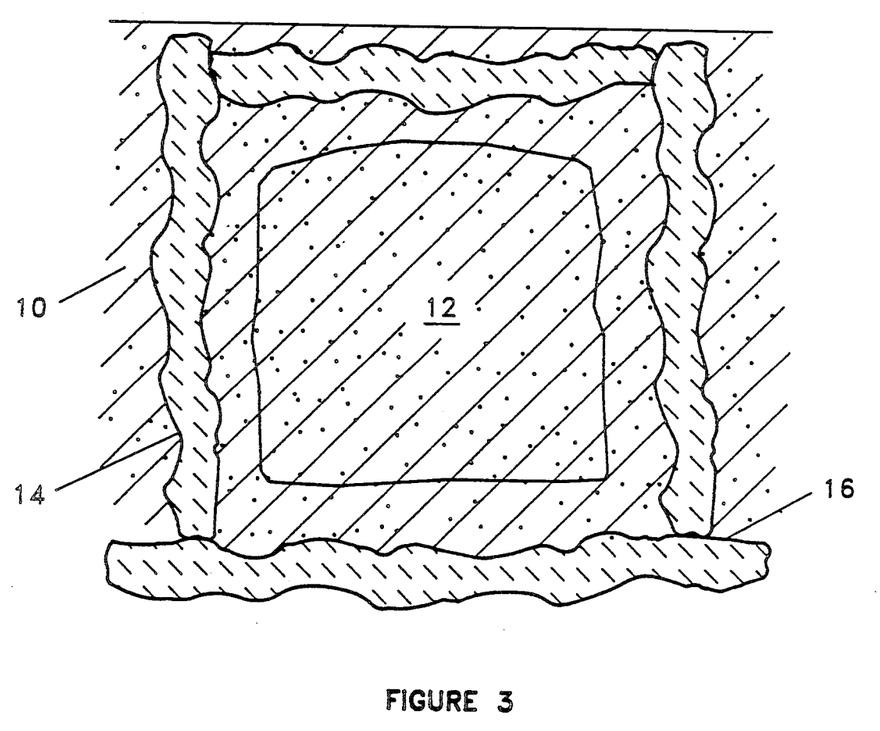
FIG. 3 is a sectional view showing a combination of vertical and horizontal vitrified underground structures on multiple sides of a contaminated zone.

FIG. 1 illustrates the ground (10) having a contaminated zone (12) therein. A vertical vitrified underground structure (14) may be placed adjacent the contaminated zone (12) as a barrier to partially isolate the contaminated zone (12) from intrusion of groundwater, animals, insects, etc. Similar isolation is illustrated in FIG. 2 with a horizontal vitrified structure (16) beneath the contaminated zone (12). More complete isolation may be achieved by combining vertical and horizontal vitrified structures. In FIG. 3, the contaminated zone (12) may be completely encased in a vitrified structure. It is to be understood that the sectional view of FIG. 3 cannot show the "front" and "back" walls of a fully enclosed structure. It may be desireable to have an enclosed structure open at the top to allow addition of chemicals or bacteria for remediation.

Figure 4:
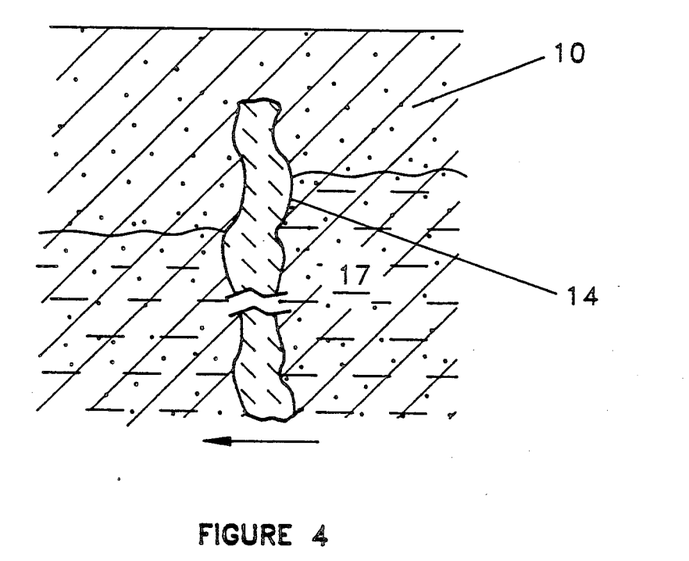
FIG. 4 is a sectional view showing a vertical vitrified underground structure serving as an aquifer dike controlling groundwater flow and groundwater elevation.
Figure 5:
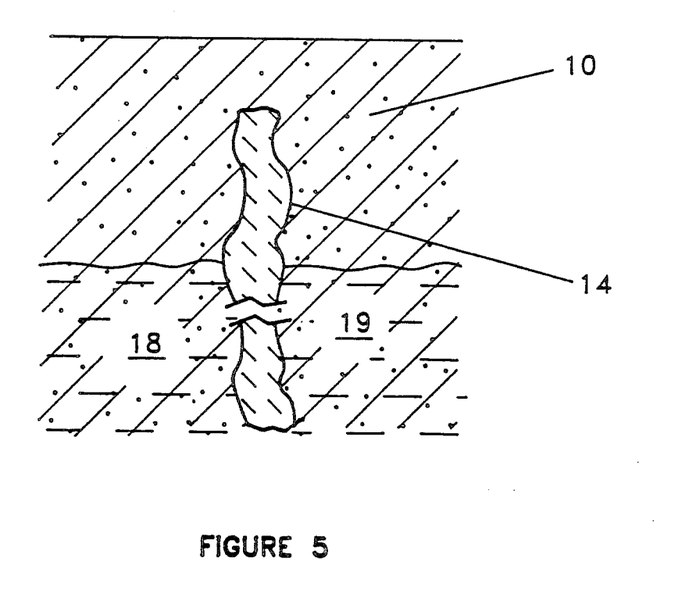
FIG. 5 is a sectional view showing a vertical vitrified underground structure serving as a barrier for contaminated groundwater.

In addition to isolating contaminated waste sites, vitrified underground structures may be used as dikes to direct the flow of aquifers or control groundwater pressure gradients as illustrated in FIGS. 4 and 5. FIG. 4 shows an underground vertical vitrified barrier (14) controlling the level of a water table (17). FIG. 5 illustrates an underground vertical vitrified barrier isolating contaminated groundwater (18) from substantially clean groundwater (19).

Figure 6:
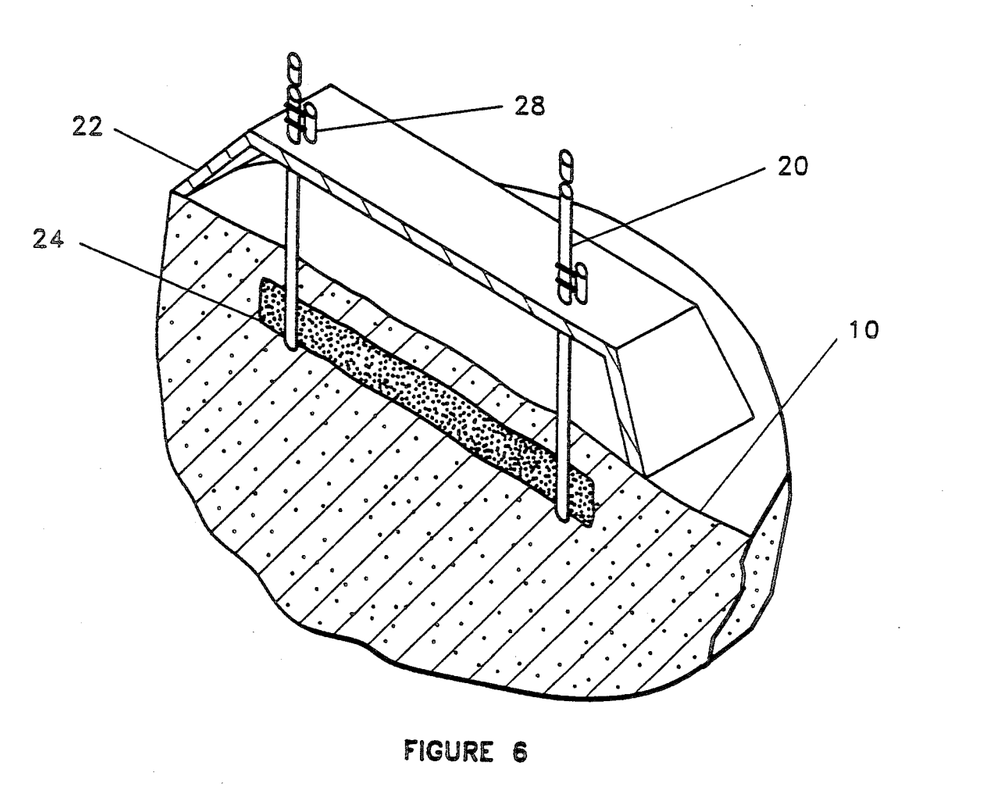
FIG. 6 is an isometric sectional view of an underground startup method.

In order to make vitrified underground structures, it is necessary to be able to start the vitrification process underground at a substantial depth below the soil surface and to propagate the vitrification process in a well defined area. FIG. 6 illustrates a startup configuration. An array of electrodes (20) are suspended in generally upright positions spaced from one another by a support structure (22) which may be an insulated and vented cover or open frame structure. An electrically conductive material (24) such as graphite or graphite mixed with glass frit is placed in the soil between the electrodes (20). The electrodes may be maintained stationary, or may be driven by a mechanical electrode feeding apparatus (28) such as described in R. K. Farnsworth et al., INITIAL TESTS ON ISV USING ELECTRODE FEEDING TECHNIQUE, PNL-7355, 1990.

Placing the initially conductive material (24) between the electrodes (20) may be accomplished in any conventional manner. For example, horizontal well drilling technology, as reported in RADIAL WELLS AND HAZARDOUS WASTE SITES, W. Dickinson et al., HMCRI Technology Series, "Sampling and Monitoring", 1989, may be utilized. Another method utilizes horizontal borehole technology developed by Eastman Christensen Environmental Services. Each of these techniques allow a drill bit to enter the soil substantially vertically at the surface and ultimately results in the borehole being substantially aligned parallel to the surface of the soil. drilling is continued parallel to the surface of the soil to the desired location. Next, the initially electrically conductive material (24) may be transported as a slurry or in a solution through the horizontal borehole to the location which will ultimately be between the electrodes. In soils which may be difficult to penetrate with horizontal boring techniques, subsurface fracturing technology well known in the drilling arts may be used.

In soils with sufficient permeability, a non-hazardous conductive solution may be injected into the soil. Permeability may be enhanced by conventional fracturing techniques. The result is an initially electrically conductive path (24) between the electrodes (20) at the desired depth. Conductive solutions include but are not limited to sodium carbonate and borax, or a combination of them.

Because excess oxygen may oxidize a portion of the initially electrically conductive path during vitrification start-up, and thereby create an open circuit preventing vitrification, it is necessary to control the flow of oxygen to the initially electrically conductive path during start up. Excess oxygen in the vitrification zone may be controlled by filling with soil any holes between the initially electrically conductive path and the soil surface.

Once vitrification is initiated underground, it may be used to form structures as described in Brouns et al. or to produce substantially planar vitrified underground structures. Substantially planar vitrified underground structures have an advantage over block type structures of Brouns et al. because they require less melted soil and thereby less electrical energy to form a barrier.

Substantially planar vitrified underground structures having a relatively narrow rectangular cross section may be made in a number of ways. Substantially planar vitrified structures may be made by controlling the path of the electrical current through the melted soil. Alternatively, they may be made by controlling the extent of the melt by controlling the apparent melting point of the target soil volume.

Figure 7:
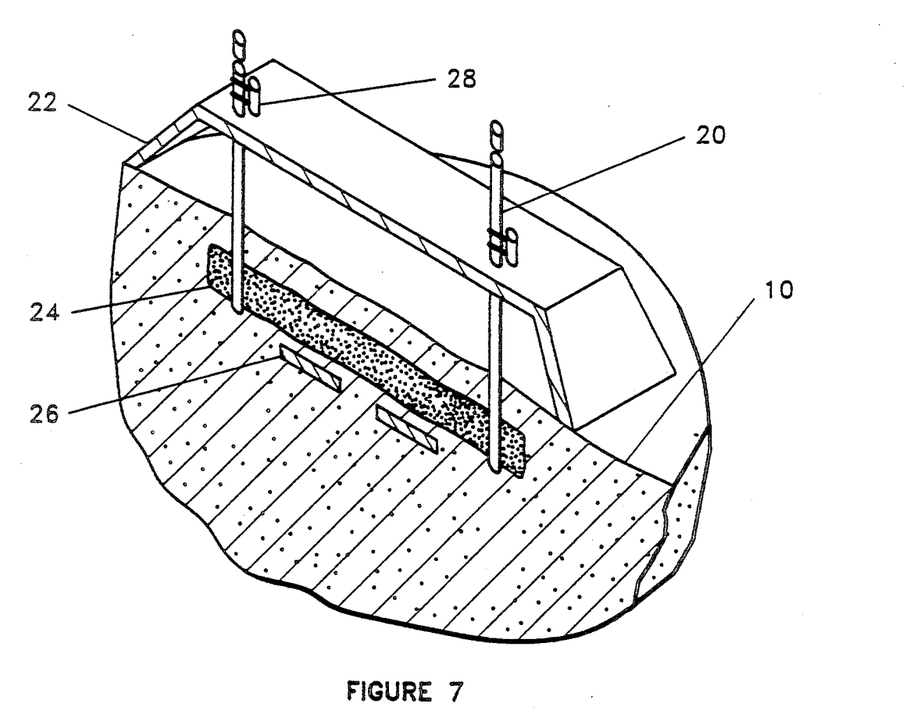
FIG. 7 is an isometric sectional view of the preparation for a vertical vitrified underground structure.
Figure 8:
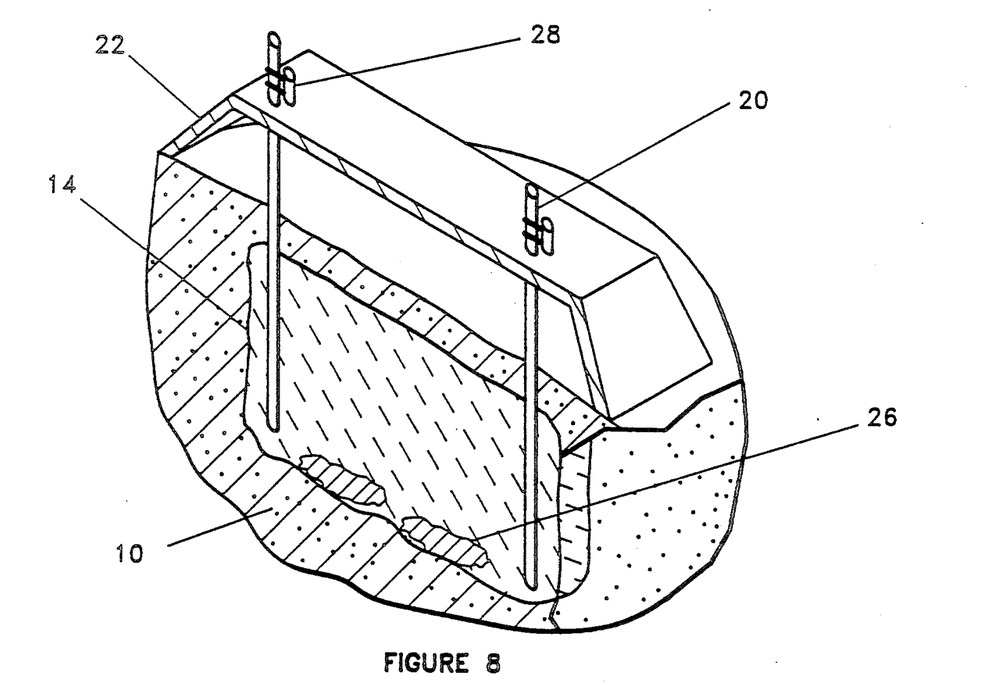
FIG. 8 is an isometric sectional view of a completed vertical vitrified underground structure.

Controlling the path of electrical current through the melt may be achieved as shown in FIGS. 7 and 8. FIG. 7 illustrates a set-up for creating a vertical vitrified underground barrier. A passive electrode (26) is placed below the electrically conductive material (24) between the electrodes (20). The passive electrode (26) may be placed above the electrically conductive material (24) as well. However, it should not be placed in the electrically conductive material (24) or the resistance of the path between the electrodes (20) may be too low to allow heating of the surrounding soil. The passive electrode (26) is passive because it is not in direct contact with the electrodes (20). The passive electrode (26) must have electrical conductivity greater than molten soil to attract electric current and be substantially chemically inert to remain viable and effective during the vitrification process. In situations for which it is desired to advance the melt downward, the density of the passive electrode (26) must be greater than molten soil so that the passive electrode (26) will remain at the bottom of the melt. In situations for which it is desireable to advance the melt upward, the density of the passive electrode must be less than molten soil so that the passive electrode (26) will remain at the top of the melt. In either situation, the passive electrode (26) must either not melt, or have surface tension different from molten soil, and have the characteristic of being immiscible with molten soil. These properties are necessary to preserve the integrity of the passive electrode to avoid short circuiting or open circuiting the electrodes (20) during the vitrification process.

For advancing the melt downward, the passive electrode may comprise ingots of stainless steel. Electricity is then applied to the electrically conductive material (24) from the electrodes (20) to heat the soil above its melting temperature. As the soil melts, an initial molten pool is formed which propagates downward toward the passive electrode (26). The passive electrode (26) may melt when engulfed by the initial molten pool, but remains at the bottom of the melt since its density is greater than the density of the melted soil. And since the passive electrode (26) is immiscible with the molten soil and has a different surface tension, the passive electrode (26) will tend to remain in a small molten pool. As the soil is melted, the electrodes (20) may be advanced downward by the use of a mechanical electrode feeding system (28). Alternatively, the electrodes (20) may be placed at the desired depth initially allowing the melt to advance downwardly under the force of gravity. After termination of the electrical current, the melt cools into its vitrified form as a vertical vitrified underground structure (14) as shown in FIG. 8.

In the case where the passive electrode (26) is conductive metal, the length of the metal is from about 60% to 95% of the distance between electrode surfaces, and the mass of the conductive metal is from about 40% to 230% of an initial mass of molten soil. The ratio of conductive metal to initial mass of molten soil is the ratio at the time that an initial mass of molten soil contacts the conductive metal passive electrode. Thus, this ratio may be varied by varying the mass of the passive electrode (26) and/or by varying the distance between the initially electrically conductive material (24) and the passive electrode (26). The greater the distance, the greater the amount of initial mass of molten soil and hence, the smaller the ratio.

For a passive electrode (26), having a density less than that of molten soil and placed above the initially electrically conductive material (24), the length and mass criteria are similar. There is some variation for different materials. However, in this application, the initially electrically conductive material (24) is placed at the bottom of the desired vertical vitrified underground structure rather than at the top.

Further control of the flow of electricity through the molten soil may be obtained by moving the electrodes as the melt progresses. For example, in an application using passive electrodes (26) which are conductive metal having a density greater than molten soil, driving the electrodes downwardly advances the melt faster than relying on gravity alone. The faster downward advance results in a vertical vitrified underground structure with a smaller cross sectional area than a slower downward advance.

In an alternative embodiment, electrodes (20) are placed to the desired depth of a vertical vitrified underground structure and the passive electrode (24) may comprise conductive solution which has been injected into the soil. In this case, the solution material must be sufficiently inert to molten soil to maintain a concentration in the molten soil sufficient to reduce the conductivity of the molten soil thereby controlling the current through the molten soil. Conductive solutions may be made from materials including but not limited to sodium carbonate or borax.

A vertical vitrified underground structure may also be made by controlling the apparent melting temperature of the soil, volume. The apparent melting temperature of the soil volume may be modified by trenching and backfilling with a mixture of soil and flux, or by injecting a flux solution into the soil volume. A ratio of 9:1 of soil to flux is preferred. The flux material may include but is not limited to sodium silicate crystal.

Multiple pairs of electrodes may be placed in the ground and as a melt is completed between one pair and the application of current terminated, an adjacent pair of electrodes may have current applied to make a new section of vitreous material.

Planar horizontal vitrified underground barriers (16) may be constructed in two ways. One way is illustrated in FIGS. 9 and 10 while another way is illustrated in FIGS. 10 through 14.

Figure 9:
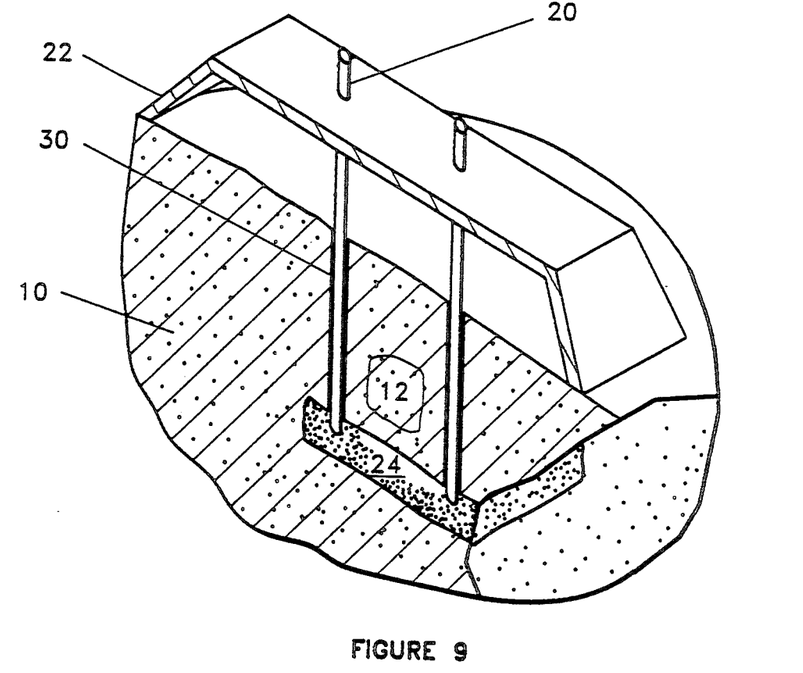
FIG. 9 is an isometric sectional view of one method of preparation for a horizontal vitrified underground structure.
Figure 10:
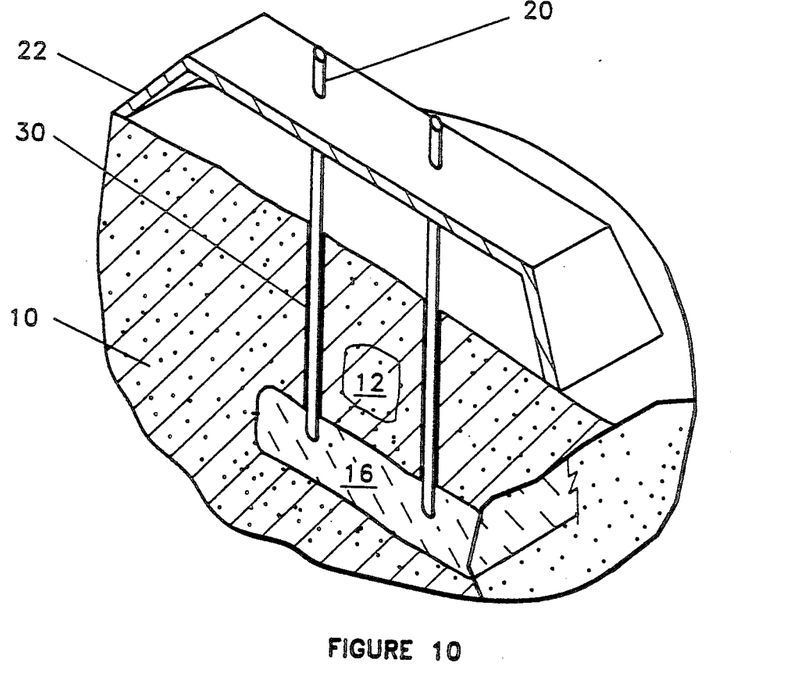
FIG. 10 is an isometric sectional view of a completed horizontal vitrified underground structure.
Figure 11:
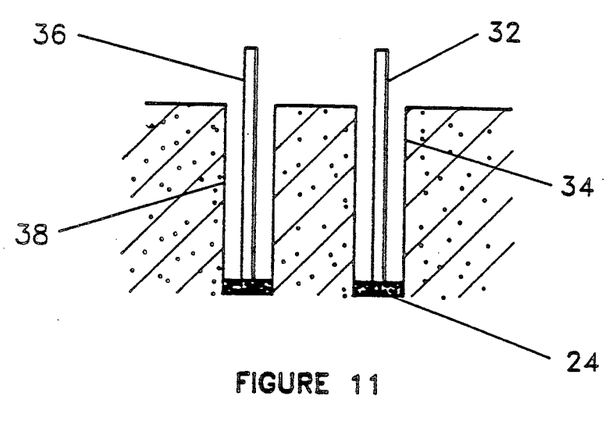
FIG. 11 is a sectional view of a second method of preparation for a horizontal vitrified underground structure.
Figure 12:
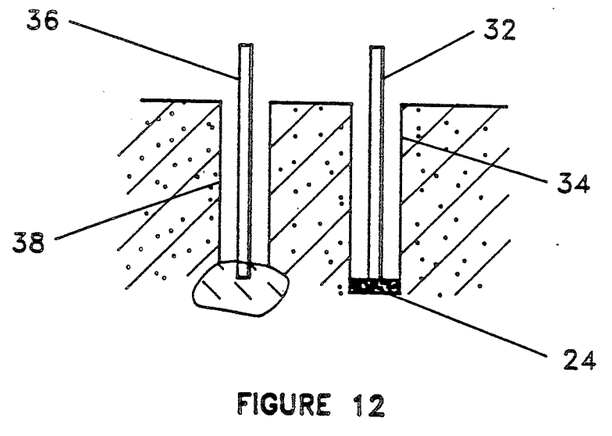
FIG. 12 is a sectional view of the initial melt for the second method of making a horizontal vitrified underground structure.

In the method depicted in FIGS. 9 and 10, Figure illustrates equipment set-up wherein initially electrically conductive material (24) is placed at a desired depth by one of the methods for underground startup previously discussed herein. Materials to either enhance electrical conductivity or reduce, apparent soil melting temperature are injected into a narrow horizontal soil zone above and below the initially electrically conductive material (24). Electrodes (20) are then suspended in generally upright positions spaced from one another by a support structure (22). The electrodes (20) are inserted into the boreholes (30) to a depth sufficient to intercept the electrically conductive material (24). Electric current is then applied heating the soil above its melting temperature. Electrical current is constrained within the melt by the injected material thereby forming a planar horizontal shape as illustrated in FIG. 10. In some soils, it may not be necessary to inject materials to reduce the apparent melting temperature or the soil or increase the electrical conductivity of the molten soil.

Figure 13:
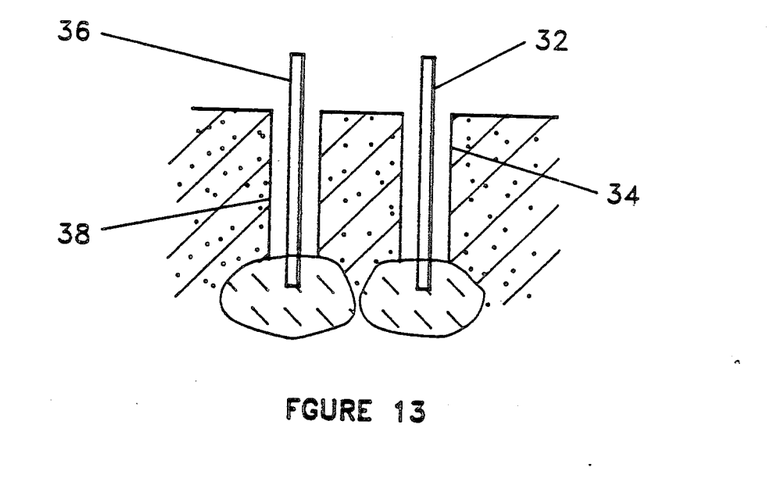
FIG. 13 is a sectional view of an intermediate step in the second method of making a horizontal vitrified underground structure.
Figure 14:
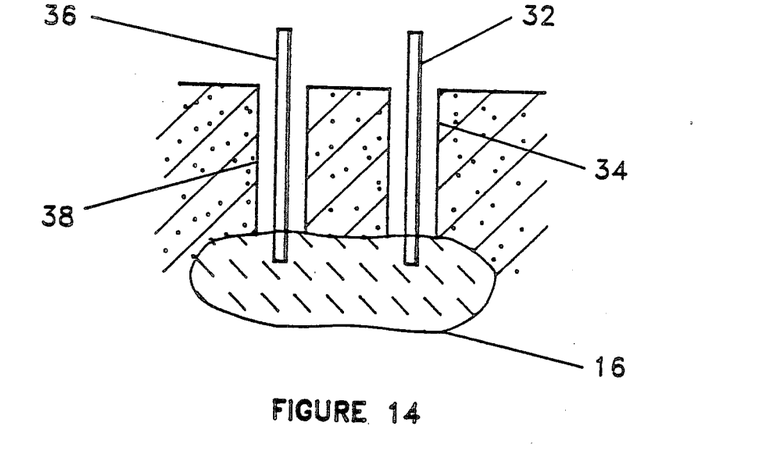
FIG. 14 is a sectional view of the completion of the second method of making a horizontal vitrified underground structure.

In the method depicted in FIGS. 11-15, assemblies (32) having at least two electrodes and which may have multiple electrodes are inserted into large diameter boreholes (34) to a depth at which a horizontal vitrified underground barrier is desired. Electrically conductive material (24) is placed in the bottom of the large borehole (34) but is not in electrical contact with an adjacent large borehole. Electric current is applied to an assembly (32) as in FIG. 12 to begin melting the adjacent soil. After the melt in the first borehole has progressed, electric current is applied to a second assembly (36) in an adjacent large borehole (38). FIGS. 13 through 15 illustrate the progression of the melt as two separate melts grow then join to form a horizontal underground barrier. When multiple melts join, electrical process parameters would be adjusted to control the thickness of the melt. For example, when two adjacent melts join, the electrodes in the assemblies are disconnected until only one electrode in each assembly is carrying electricity. At this point, the system configuration is the same as standard vitrification configuration. Further boreholes would increase the size of the final horizontal vitrified underground barrier. When the melt has reached the desired size, electric current is terminated and the melt allowed to cool into a vitreous mass.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A method for making vitrified underground structures, comprising the steps of:
   (a) inserting at least one pair of electrodes into soil in the ground at spaced positions from one another;
   (b) providing an initial electrically conductive resistance path in the soil across the electrodes;
   (c) providing a passive electrode in the form of an electrically conductive material for controlling the path of electrical current through the soil thereby limiting the extent of the soil that is melted and producing a substantially planar approximately rectangular cross section volume;
   (d) passing electrical current through the electrically conductive resistance path by application of current to the electrodes to heat the soil about the path of its melting temperature;
   (e) continuing application of current to the electrodes until the soil between them and immediately adjacent to them has been melted; and
   (f) terminating application of current to the electrodes to permit cooling and solidification of substantially all the melted soil in situ between the electrode positions into a solid planar mass.

2. The method as recited in claim 1 wherein the electrically conductive material is
   a conductive metal.

3. The method as recited in claim 2 wherein the conductive metal has a length from about 60% to about 95% of the distance between electrode surfaces, and has a mass from about 40% to about 230% of an initial mass of molten soil.

4. The method as recited in claim 1, wherein providing a passive electrode comprises the steps of:
   (a) placing initially electrically conductive material over a broad underground area; and
   (b) injecting a conductive material adjacent the underground area.

5. The method as recited in claim 4, further comprising:
   providing conductive material form the group consisting of sodium carbonate and borax.

6. A method as in claim 6, wherein placing initially electrically conductive material over a broad underground area, comprises the steps of:
   (a) drilling a horizontal bore intersecting at least two vertical electrode boreholes,
   (b) filling the horizontal bore with an initially electrically conducting material, and
   (c) backfilling with soil any remaining holes between a soil surface and the horizontal bore.

7. A method for making vitrified underground structures comprising the steps of:
   (a) placing assemblies having a plurality of electrodes therein in large boreholes, together with electrically conductive material in the bottom of the boreholes such that there is substantially no electrical contact between large boreholes,
   (b) passing electrical current through a first assembly to heat the soil surrounding a first borehole to its melting temperature,
   (c) continuing application of current to the first assembly until the soil surrounding the first borehole of the first assembly has been melted;
   (d) passing electrical current through a second assembly to heat the soil surrounding a second borehole to its melting temperature;
   (e) continuing application of current to the first and second assemblies enlarging each melt substantially symmetrical about each borehole until the soil between them has been melted;
   (g) reducing current through the assemblies after the soil between them has been melted by disconnecting individual electrodes within the assemblies leaving one electrode in each assembly connected, such that electrical contact through the melted soil between remaining connected electrodes is maintained, and
   (f) terminating application of current to the remaining connected electrodes of the assemblies to permit cooling and solidification of substantially all the melted soil in situ between the electrode positions into a solid planar mass.

8. A method for making vitrified underground structures, comprising the steps of:
   (a) inserting at least one pair of electrodes into soil in the ground at spaced positions from one another;
   (b) providing an initial electrically conductive resistance path in the soil across the electrodes;
   (c) controlling the apparent melting temperature of the soil for limiting the extent of soil melting to a substantially planar approximately rectangular cross section volume;
   (d) passing electrical current through the electrically conductive resistance path by application of current to the electrodes to heat the soil about the path to its melting temperature;
   (e) continuing application of current to the electrodes until the soil between them and immediately adjacent to them has been melted; and
   (f) terminating application of current to the electrodes to permit cooling and solidification of substantially all the melted soil in situ between the electrode positions into a solid planar mass.

9. The method as recited in claim 8, further comprising:
   injecting a flux into the soil.

10. The method as recited in claim 9, further comprising:
    providing a flux consisting of sodium silicate crystal.

11. The method as recited in claim 8, wherein controlling the apparent melting temperature of the soil, comprises:
    (a) digging a trench between the electrodes; and
    (b) backfilling the trench with a mixture of soil and flux.

12. The method as recited in claim 11, further comprising:
    providing a ratio of soil to flux of 9:1.

13. The method as recited in claim 12, further comprising:
    providing a flux consisting of sodium silicate crystal.

14. A method for making vitrified underground structures, comprising the steps of:
    (a) inserting at least one pair of electrodes into soil in the ground at spaced positions from one another;
    (b) controlling the apparent melting temperature of the soil and limiting the extent of soil melting to a substantially planar approximately rectangular cross section volume by digging a trench between the electrodes and backfilling the trench with a mixture of soil and flux;
    (c) providing an initial electrically conductive resistance path in the soil across the electrodes;
    (d) passing electrical current through the electrically conductive resistance path by application of current to the electrodes to heat the soil about the path to its melting temperature;
    (e) continuing application of current to the electrodes until the soil between them and immediately adjacent to them has been melted; and
    (f) terminating application of current to the electrodes to permit cooling and solidification of substantially all the melted soil in situ between the electrode positions into a solid planar mass.

15. The method as recited in claim 14, further comprising:
    providing a ratio of soil to flux of 9:1.

16. The method as recited in claim 15, further comprising:
    providing a flux consisting of sodium silicate crystal.

* * * * *

UNITED STATES PATENT AND TRADEMARK OFFICE
CERTIFICATE OF CORRECTION

PATENT NO. : 5,114,277
DATED : May 19, 1992
INVENTOR(S) : MT Murphy, et al

It is certified that error appears in the above-indentified patent and that said Letters Patent is hereby corrected as shown below:

In column 8, line 7, claim 6, "claim 6" should read --claim 4--.

Signed and Sealed this

Eighth Day of February, 1994

Attest:

BRUCE LEHMAN

Attesting Officer     Commissioner of Patents and Trademarks